(12) United States Patent
Soini et al.

(10) Patent No.: US 10,025,654 B2
(45) Date of Patent: Jul. 17, 2018

(54) DIAGNOSTIC AND WORKFLOW ENGINE WITH SYSTEM INTEGRATION

(71) Applicant: T-Mobile, USA, Inc., Bellevue, WA (US)

(72) Inventors: Jonathan Michael Soini, Seattle, WA (US); Alex Nguyen, Bellevue, WA (US); Timothy Adam Shelton, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 93 days.

(21) Appl. No.: 15/089,322

(22) Filed: Apr. 1, 2016

(65) Prior Publication Data

US 2017/0286199 A1 Oct. 5, 2017

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01)

(58) Field of Classification Search
CPC .................................................. G06F 11/079
USPC ...................... 714/40, 39, 41, 46, 47.1, 47.2
See application file for complete search history.

(56) References Cited

U.S. PATENT DOCUMENTS

| | | | |
|---|---|---|---|
| 8,365,009 B2* | 1/2013 | Dournov | G06F 11/0709 709/223 |
| 9,658,914 B2* | 5/2017 | Ganesan | G06F 11/0778 |
| 2002/0116484 A1* | 8/2002 | Podracky | H04L 41/069 709/223 |
| 2009/0044185 A1* | 2/2009 | Krivopaltsev | H04L 29/06 717/173 |
| 2017/0019291 A1* | 1/2017 | Tapia | H04L 41/0631 |

* cited by examiner

*Primary Examiner* — Dieu-Minh Le
(74) *Attorney, Agent, or Firm* — Lee & Hayes, PLLC

(57) ABSTRACT

A workflow engine on a computing device is used to resolve a trouble ticket. Preliminary data is retrieved and one or more symptoms are received from a user device having a malfunction. The probability of each possible cause of the malfunction is determined. Upon determining that a probability of a mostly likely cause of the malfunction is above a predetermined threshold, a solution is provided. Upon determining that the probability of the most likely cause of the malfunction is not above the predetermined threshold, then entering a loop of performing diagnostic steps until the likely cause of the malfunction is above a predetermined threshold. Each diagnostic step is performed automatically, if the workflow engine determines that it can. If the diagnostic step cannot be performed automatically, the CSR is guided on how to accommodate the diagnostic step.

20 Claims, 5 Drawing Sheets

DIAGNOSTIC AND WORKFLOW ENGINE WITH SYSTEM INTEGRATION

BACKGROUND

Mobile devices are integral to the daily lives of most users. Mobile devices are used to make voice calls, check email and text messages, update social media pages, stream media, browse websites, and so forth. As a result, users expect their mobile devices to provide many functions, including reliably working on a mobile telecommunication carrier to receive constant and dependable telecommunication and data communication services.

The reliability of a mobile device and the telecommunication and data communication services that it subscribes to may be affected by multiple factors, such as geography and terrain, device features and capabilities, as well as network infrastructure and network coverage deployment. With the ever increasing complexity of contemporary mobile devices and wireless telecommunication networks, users may become overwhelmed by the amount of device and network parameters that can affect communication service performance.

Due to the integral aspect of today's mobile devices coupled with their ever increasing complexity, many users simply return their mobile devices at the earliest symptoms of service problems. In at least one study, over 63% of returned mobile devices are found to have no fault, which costs the global industry $4.5 billion in replacement, refurbishment, and shipping costs.

Even when users call a customer service representative (CSR) of the mobile telecommunication carrier to resolve their mobile device problems, their issues may not be readily resolved because the quality of the response may be a function of how accurately a user describes the status of their mobile device and the experience level of the CSR. Routing every service call to the most experienced technician is impractical because the technician may be overloaded with requests, thereby increasing the waiting period for the customer, and thus, degrading the customer experience.

While diagnostic checklists can be used by users and customer care representatives alike to systematically analyze and solve mobile device problems, such diagnostic checklists may be laborious and time consuming to use. Further, some diagnostic checklists may not be tailored to the specific mobile devices that are experiencing the service problems. Other diagnostic checklists are developed with the assumption that a user has a certain level of familiarity with the features of their mobile device. This may pose difficulty in a situation where the CSR is providing remote support via telephone and the user actually lacks such familiarity. Accordingly, the use of diagnostic checklists that are part of a rigid flow may on occasion lead to frustration for both the user and the customer care representative.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Overview

Figure 1:
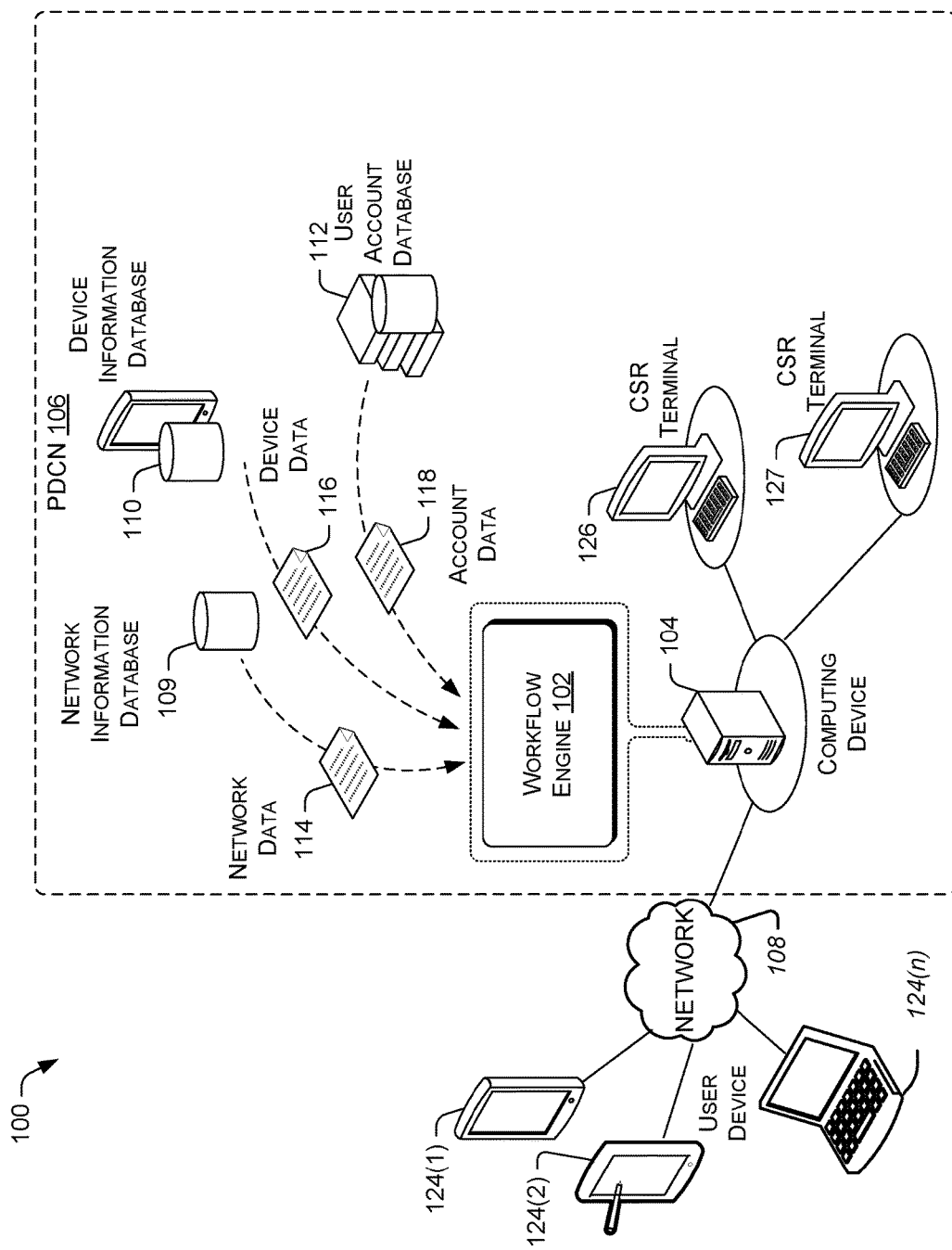
FIG. 1 illustrates an example architecture for deploying a workflow engine for troubleshooting user devices.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

This disclosure is directed to diagnosing a source of a malfunction of a user device and a solution therefor, and more particularly, to techniques for using a remote workflow engine to troubleshoot and resolve issues of user devices. Today, issues with user devices may include, inter alia, frequent freezing, slow processing, rapid discharge, poor reception, and the like. In some instances, the issues may be network coverage problems that affect the ability of the user device to access wireless communication services. For example, the network coverage problem may manifest itself as frequently dropped calls, incomplete calls, slow data downloads or uploads, and/or other symptoms. In other instances, the issues may be related to compatibility of a user device with the service, return, exchange, or upgrade policies of a telecommunication carrier that operates the wireless telecommunication network. For example, a user device may have installed software or enabled application features that make the user device incompatible with such policies of the telecommunication carrier. Accordingly, the remote workflow engine may detect such issues without substantial involvement of a customer service representative (CSR) and the customer (i.e., operator of the user device).

The diagnostic flow may be in the form of dynamically generated diagnostic steps that are performed interactively between the remote workflow engine and the user device (and/or other network components), to automatically resolve a malfunction or assist a CSR in resolving the malfunction associated with the trouble ticket, sometimes referred to herein as a troubleshooting request. When a diagnostic step cannot be performed automatically, the workflow engine guides the CSR as how to accommodate the next diagnostic step. Accordingly, for a diagnostic step, the remote workflow engine first determines whether it can be performed automatically (i.e., without the involvement of the CSR and/or the customer). If customer involvement is beneficial, the remote workflow engine instructs the CSR as to how to guide the customer to perform the diagnostic step. The workflow engine may dynamically adjust a next step based on the results of the last diagnostic step that are received either automatically from the user device (or another network component) or via manual entry from the CSR. The diagnostic steps may also offer technical information, device setting modifications, links to software fixes, and/or so forth that advance the resolution of the trouble ticket.

In some embodiments, the workflow engine may automatically filter out diagnostic steps for a trouble ticket for a user device based on data related to, among other parameters, a user device type, and/or a user account type. Such data may be received from various network databases. In other embodiments, the workflow engine may automatically accommodate a diagnostic step (e.g., without direct involvement of the customer or the CSR) by automatically determining the answers to the diagnostic step by extracting the relevant information from the user device, or one or more network databases. In one embodiment, the network databases may include a network information database, a device information database, and a user account database.

The workflow engine may iteratively fine-tune the diagnostic steps until a resolution for the trouble ticket is found. For each diagnostic step, the probability of the different likely causes of the malfunction associated with the trouble ticket are determined, based on the presently available data. For the possible cause of highest probability, additional diagnostic steps may be performed in order to improve the confidence level in the diagnosed cause of the malfunction. The diagnostic steps may be in the form queries that result in feedback that is received from various electronic sources automatically, or manually from the CSR. Initially, automatic sources of feedback are pursued by the workflow engine, such as direct data from the user device, previously stored data related to the user device, network data, and account data, sometimes collectively referred to herein as automatic sources. When the automatic sources are not effective in accommodating a diagnostic step, then the workflow engine instructs the CSR on what additional feedback is to be extracted and how to guide the customer in obtaining that information.

In further embodiments, the workflow engine may collect and analyze statistics retrieved from the network databases to determine systemic problem trends and the effectiveness of diagnostic steps in resolving issues.

The use of automatic sources of data to dynamically streamline diagnostic steps enable CSR's to resolve issues relating to the user device in a more expedient and effective manner The use of the workflow engine as part of a customer care infrastructure discussed herein reduces the effort on the part of the CSR and the tasks requested from the customer, resulting in a more consistent and efficient resolution of the trouble ticket. The techniques described herein may be implemented in a number of ways. Example implementations are provided below with reference to the following figures.

Example Architecture

FIG. 1 illustrates an example architecture 100 for implementing a customer care system having a workflow engine for diagnostic user devices. Architecture 100 includes a network 108 that allows various user devices 124(1) to 124(n) to communicate with each other as well as any other components that are connected to the network 108. The network 108 may be, without limitation, a local area network ("LAN"), a virtual private network ("VPN"), a cellular network, or the Internet. To facilitate the present discussion, network 108 will be described, by way of example only and not by way of limitation, as a mobile network as may be operated by a carrier or service provider to provide a wide range of mobile communication services and ancillary services or features to its subscriber customers and associated mobile device users. Network 108 allows users of the user devices (e.g., customers or subscribers to the network 108), to send information to and receive information from a packed data communication network (PDCN) 106 that provides ancillary support to the network 108.

The PDCN 106 includes a workflow engine 102 that may execute on one or more computing device 104. The computing device 104 may include general purpose computers, such as desktop computers, tablet computers, laptop computers, servers, and so forth. However, in other embodiments, the computing device 104 may include smart phones, game consoles, or other electronic devices that are capable of receiving inputs, processing the inputs, and generating output data. In various embodiments, the computing device 104 may be controlled by a mobile telecommunication carrier that provides the wireless telecommunication network 106, or controlled by a third-party entity that is working with the mobile telecommunication carrier. While a single computing device 104 is illustrated, it will be understood that the functions of the computing device 104 may be implemented in a distributed fashion on a number of similar platforms, to distribute the processing load.

The workflow engine 102 may access data that is stored on a network information database 109, a device information database 110, and a user account database 112 of the wireless telecommunication network 106. The workflow engine 102 may also communicate with a user device (e.g., 124(1)) to receive data therefrom. Accordingly, the workflow engine 102 may obtain network data 114 from the network information database 109. The network data 114 may include information regarding the technical and operational status of the wireless telecommunication network. For example, network data of the network may indicate that LTE coverage is unavailable in a particular geographical area or that a network node was temporarily overwhelmed with network traffic at a particular time due to a major event.

The device information database 110 may provide the workflow engine 102 with previously stored device data 116. The device data 116 may indicate the technical capabilities, feature settings, and operational statuses of various user devices. For example, device data for a particular user device may indicate the latest firmware, the amount of memory, the processor speed, what sensors it includes, and so forth. In one embodiment, the device information database 110 may also include the history data for a user device (e.g., regardless of the MSISDN that was tied to the user device at the time of the analysis). For example, a customer may have a used user device and may not be aware of the history of the user device. However, the device information database 110 may account for any past issues that the user device may have had and is configured to provide such information during diagnostics, as appropriate.

The workflow engine 102 may obtain account data 118 from the user account database 112. The user account database 112 may store the account details of multiple users, such as account type, billing preferences, service plan subscription, payment history, data consumed, minutes of talk time used, and so forth, of each user. For example, the account data of a user may indicate that the user has a postpaid account and that the user is current with payments for the subscribed service plan.

The workflow engine 102 may also directly (i.e., electronically) interact with a user device (e.g., 124(1)) to obtain user device status information therefrom. For example, the workflow engine 102 may interact with a device management application stored in a memory of a user device (e.g., 124(1)) to determine sensor status information and other performance indicators. Thus, the workflow engine 102 may interact with a user device (e.g., 124(1)) to determine its present central processing unit (CPU) load, its operating system, how much memory is available, its location information, whether Bluetooth is active, device temperature, whether the device was exposed to moisture, and the like, as appropriate during a diagnostic session. In one embodiment, the device management application may be used by a customer to initiate the troubleshooting of the user device (e.g., 124(1)). Upon the device management application determining that it cannot resolve the issue independently, the device management application may interact with the workflow engine 102 to provide the harvested device status information.

The direct data from the user device (e.g., 124(1)), the network data 114 from the network information database 109, stored device data 116 from the device information database, and account data 118 from the user account database 112 provide the automatic portion of the data that may be retrieved by the workflow engine.

In addition, the workflow engine may receive data input manually from a CSR operating a terminal such as CSR terminals 126 and 127. For example, CSR terminal 126 may be operated by a general care operator who may be providing a front line of interaction to a customer. Upon determining that the automatic data sources are not sufficient, the workflow engine 102 may display on a terminal (e.g., 126) the next point of inquiry. Such information may be displayed in the form of a dashboard that is operative to guide the CSR from one diagnostic step to another in the process of identifying the cause of the malfunction. Put differently, when the automatic sources are not effective in accommodating the next diagnostic step, then the workflow engine instructs the CSR on what additional feedback is to be extracted and how to guide the customer in obtaining that information. Since the detailed instructions are provided to the CSR by the workflow engine 104, an advanced technical knowledge of the network 108, PDCN 106, or the user device is not required for the CSR. However, if a situation presents itself where the additional technical expertise is warranted, in one embodiment, the workflow engine 102 automatically escalates the complaint ticket to a technical care specialist at a different terminal (e.g., 127). For example, the workflow engine 102 may determine that the last one or more inquiries via the CSR did not provide any meaningful results that would further advance the investigation into the root cause of the malfunction. For example, the probability of a correct diagnosis is not improving with time. In this regard, the workflow engine may escalate the diagnostic flow to a more experienced CSR or even request the user device to be sent for further diagnostics.

The workflow engine 102 may iteratively generate a diagnostic flow that is tailored for the present user device (e.g., 124(1)), the determined symptoms of the user device, and other identified data related to the user device. The related data may include preliminary data such as the model, make, operating system, a version of the operating system, a list of active programs that are presently running on the user device, and the like. Additional data may be determined iteratively, as appropriate during the diagnostic flow, by the workflow engine. Thus, instead of having a rigid predetermined flow, the diagnostic flow is dynamically created based on the data retrieved from various sources, such as the network information database 109, device information database 110, user account database 112, the user device 124(1), or from the CSR via a terminal 126, 127. It should be noted that while terminals 126 and 127 are illustrated as being separate from the computing device 104, as used herein, they are considered an extension of the computing device 104. Put differently, the display of the terminal 126 or 127 is considered a display of the computing device 104.

In order to accommodate a diagnostic step from the workflow engine 102, each user device (124(1) to 124(n)) may include a device management application that is stored in a memory of the user device. The device management application is operative to provide interactive and automatic support to the workflow engine 102 in checking the health and retrieving performance parameters of the user device (e.g., 124(1)), collectively referred to herein as key performance indicators (KPI). In various embodiments, the device management application provides such KPI's in the form of electronic data to the workflow engine 102 upon request (e.g., in a diagnostic step) or may send the data periodically to the device information database 110 or the user account database 112 over the network 108 as part of a regular user device check.

In one embodiment, the device information database and/or the user account database 112 may receive KPI's periodically from several user devices (124(1) to 124(n)) via their device management applications stored in their memory, respectively. In this way, the workflow engine 102 may identify systemic problem trends with specific user devices, emerging or ongoing network issues, and/or new subscriber behavior trends, by retrieving such information as part of a diagnostic step.

It is emphasized that the workflow engine 102 minimizes assigning diagnostics steps to the customer and/or the CSR. When an operation cannot be performed automatically, the CSR is involved via instructions on a dashboard of the terminal 126. To that end, any operation that can be performed automatically (e.g., without direct involvement of the client or the CSR) is automatically performed by the workflow engine in collaboration with network databases and/or user device (e.g., 124(1)).

For example, instead of instructing the CSR via the dashboard to determine what programs are presently running on the user device, the workflow engine may determine based on the model/make/configuration of the user device 124(1) that such diagnostic step can be performed automatically. To that end, the workflow engine electronically communicates with the user device (e.g., 124(1)) over the network 108 to perform such diagnostic step. More particularly, the device management application of the user device (e.g., 124(1)) receives the diagnostic step request, collects the relevant data, and sends the resulting data of the diagnostic step to the workflow engine 102, thereby accommodating the diagnostic step without direct customer or CSR involvement.

Thus, instead of instructing the CSR via the dashboard to "select from the list the applications that are presently running on the user device," which may require the CSR to provide step by step instructions to the customer on (i) how to determine the programs presently running, and then (ii) the CSR entering/selecting those programs on the dashboard of the terminal 126, the diagnostic step is performed automatically, thereby saving time and frustration for both the customer and the CSR.

Similarly, some diagnostic steps may be performed automatically by retrieving data from the network information database 109, device information database 110, and/or the user account database 110 (collectively referred to herein as the network database). For example, the workflow engine 102 may generate a diagnostic step of "is the user device authorized to use 4G in the presently located region," in order to further narrow down the cause of the malfunction. To that end, instead of asking the customer for the location of the user device and whether they have activated roaming, the workflow engine may (i) interact with the device management application of the user device (e.g., 124(1)) to retrieve the location information via GPS coordinates and/or cell tower triangulation, and (ii) interacting with the user account database 112 to determine whether the user has enabled international roaming for the device. In various embodiments, both inquiries can be performed concurrently or in series. In one embodiment, the dashboard of the terminal (e.g., 126, 127) indicates what diagnostic step is presently being automatically performed by the workflow engine.

After each diagnostic step, the workflow engine may evaluate whether the probability of the present diagnosis is above a predetermined threshold level (e.g., 95%). If not, one or more additional diagnostic steps may be introduced by the workflow engine until the threshold probability criterion of the likely cause of the malfunction is satisfied.

In one embodiment, the present diagnostic step impacts the presentation of the dashboard. For example, diagnostic steps that are presently active may be graphically highlighted on the dashboard with visual cues, such as animation of where the information is being extracted from and the status of completion. The visual cues may include specific symbols, data formats, fonts, color combinations, and/or so forth. Such visual cues may be useful for the CSR to explain what diagnostic step is being presently performed and how much longer it will take to complete. In one embodiment, the device management application on the user device 124(1) displays such status information automatically, or upon approval from the CSR, to provide the customer a more interactive experience.

In further embodiments, the workflow engine 102 may collect and analyze statistics on the diagnostic implementation and diagnostic results to determine emerging systemic problem trends and the effectiveness of diagnostic techniques. In this way, the workflow engine 102 may assist network engineers and other staff of the mobile telecommunication carrier in preempting problems, applying the most effective solutions to issues, and reducing customer care workload.

Example Computing Device Components

Figure 2:
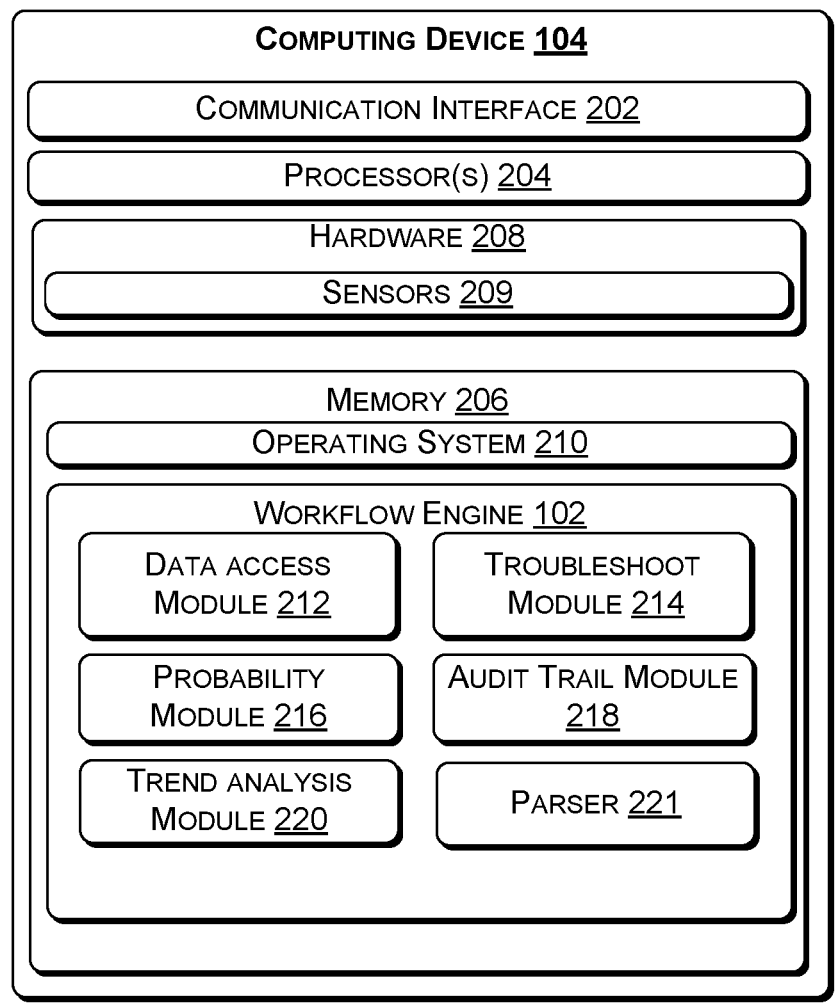
FIG. 2 is a block diagram showing various components of a computing device that implements a workflow engine.

FIG. 2 is a block diagram showing various components of a computing device that implements the workflow engine for assisting a CSR in interactively diagnosing a user device. The computing device 104 may include a communication interface 202, one or more processors 204, memory 206, and hardware 208. The communication interface 202 may include wireless and/or wired communication components that enable the computing device to transmit data to and receive data from other networked devices. The hardware 208 may include sensors 209, one or more additional hardware interfaces, a data communication block, and/or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices. Sensors may include an accelerometer, a gyroscope, a global positioning system (GPS), a temperature sensor, a moisture sensor, and the like.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 204 and the memory 206 of the computing device 104 may implement an operating system 210 and the workflow engine 102. The operating system 210 may include components that enable the computing device 104 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The workflow engine 102 may include a data access module 212, a troubleshoot module 214, a probability module 216, an audit trail module 218, a trend analysis module 220, and an outbox module 222. The modules may include routines, program instructions, objects, and/or data structures that perform particular tasks or implement particular abstract data types.

The data access module 212 may retrieve data from various sources, such as network databases 108, 110, and 112 of FIG. 1. In various embodiments, the data access module 212 may retrieve data that is relevant to a particular user device from the network databases 108, 110, and 112 in response to commands from the troubleshoot module 214 or the probability module 216. The relevant data for a user device may include any of the network data 114, device data 116, or the account data 118 that are related to the configuration and status of the computing device 104. In one embodiment the access module 212 retrieves preliminary data from various sources before an additional diagnostic step is performed. The preliminary data may include a model of the user device, the operating system (and the version thereof), a list of active programs that are running on the user device, etc.

In some embodiments, the data access module 212 may have the ability to directly query a user device for device information. In such embodiments, a diagnostic step (e.g., in the form of a query) that is initiated by the data access module 212 may be received by a device management application on the user device. In turn, the device management application may provide a response that includes the device information being queried. For example, the data access module 212 may initiate a query in the form of a diagnostic step to determine whether Wi-Fi calling is enabled on a user device. The device management application may respond with the Wi-Fi calling enablement status of the user device. In at least one embodiment, the user may have the ability to select whether the device management application is to respond to queries from the data access module 212 through a configuration setting of the application. In this way, the user may be given an opportunity to opt out of providing information to the data access module 212.

The troubleshoot module 214 may initiate trouble-shooting upon the CSR receiving a troubleshooting request from a customer (e.g., user or account holder of a user device). The troubleshoot module 214 attempts to perform each diagnostic step automatically (i.e., without the involvement of the customer and/or the CSR) in order to streamline the process and unburden both the customer and the CSR. Based on the harvested data from the various sources, the troubleshoot module 214 attempts to determine the cause of the malfunction in order to provide the appropriate solution therefor. If the probability of the possible solution is not above a predetermined threshold level (e.g., 95%) then one or more additional diagnostic steps are introduced in order to further advance the probability of a correct diagnosis of the source of the malfunction related to the trouble-ticket. After each diagnostic step, the probability is reassessed and a determination is made as to whether and what the next diagnostic step should be.

If a diagnostic step cannot be performed automatically, the output module 22 sends instructions in connection with the diagnostic step to the CSR on a dashboard of a terminal. The instructions may include how to guide the customer to determine the correct information. The dashboard may include prepopulated selections that the CSR can select in a binary way or manually enter the relevant data.

The probability module 216 may determine the probability of each possible cause of the malfunction for the present trouble ticket (i.e., trouble-shooting request from the customer). The probability of each cause of the malfunction is based on the present knowledge (i.e., data) related to the user device. As more knowledge is obtained via diagnostic steps, the closer to the true cause of the malfunction the workflow engine 102 may lead. To that end, the known data related to the user device increases one diagnostic step at a time. After each diagnostic step, the probability module 216 may reassess the probability of each possible cause of the malfunction. If the probability of the most likely cause is below a predetermined threshold, the investigation continues, one diagnostic step at a time until the probability threshold is met.

The audit trail module 218 may record every diagnostic step performed and create a log of the state of the user device. Further, the audit trail module may collect feedback from each diagnostic step. In some embodiments, a diagnostic step may be equipped with an effectiveness rating interface displayed on the dashboard of the CSR. The effectiveness rating interface may enable the CSR to make a binary assertion of whether the associated step or notification was helpful or not helpful in resolving an issue. Alternatively, the effectiveness rating interface may be a rating scale that enables a user to assign a scale value to the helpfulness of the associated step or notification in resolving the issue.

In one embodiment, at predetermined events, the audit trail is sent as device data 116 to the device information database 110. A predetermined event may include identifying the cause and/or solution of the malfunction. Alternatively or in addition, failed sequence of diagnostic steps are recorded by the audit trail module 218 and sent to the device information database 110 as diagnostic steps that were not effective, for future reference by the workflow engine 102. In one embodiment, such information may be later retrieved by the workflow engine 102 for a subsequent troubleshooting session and will be part of the machine learning of diagnostic paths to avoid or to un-prioritize.

In some scenarios, a trouble-shooting request may not be resolved during a single call. For example, the customer may decide to continue the interactive diagnosis of their computing device with the CSR at a later time. To that end, the audit trail module 218 of the workflow engine 102 is configured to record the audit trail with an indication that resolution for the trouble-ticket has not yet been found. The diagnosis can later be continued at the point where it was left off. Since the audit trail is recorded by the workflow engine 102, the CSR (who may be different from the original CSR) may simply continue the diagnostics where it was left off upon confirming that the customer is calling about the same trouble ticket. For example, if the cause of the original malfunction was not identified and/or a solution was not provided, the audit trail module 218 may record such status in the user account database 112. Upon receiving a subsequent call from the customer, the status may be retrieved from the user account database 112 and the CSR can continue the diagnosis of the user device upon confirmation from the customer that the call is related to the same trouble ticket.

In one embodiment, the troubleshooting may be initiated before the workflow engine 102 is involved. For example, the device management application may be used by a customer to initiate the troubleshooting of the user device. The device management application of the user device may then interact with the workflow engine 102 to provide the harvested device status information. Accordingly, a customer, assisted by the device management application of their user device, may start the troubleshooting process before the workflow engine 102 and/or the CSR are involved.

The trend analysis module 220 may generate one or more diagnostic steps in order to determine whether the symptoms of the subject user device are consistent with what other similar devices are experiencing. In various embodiments, the trend analysis may be performed during the gathering of preliminary data or part of a later diagnostic step.

For example, the trend analysis module 220 may determine from the network information database 109 or the device information database 110 whether other similar devices (e.g., similar in configuration or geographic location) are experiencing similar symptoms. If so, the trend analysis module 220 may provide an additional diagnostic step in order to confirm that the subject user device is part of a trend. For example, the trend analysis module 220 may automatically determine whether the subject user device is using the same cell tower as the other user devices experiencing similar symptoms, by retrieving such information from the network information database 109 and/or the device management application of the subject user device. If so, it is likely that the malfunction is related to the cell tower. In another example, the trend analysis module 220 may generate an additional diagnostic step to determine whether a version of a program that the subject user device is running, is part of a trend of malfunctioning user devices.

The trend analysis module 220 may collect the results of the diagnostic step(s) for analysis. Accordingly, the trend analysis module 220 may use machine learning to detect trends or patterns in the results generated by the diagnostic steps. In various embodiments, the machine learning may make use of techniques such as supervised learning, unsupervised learning, semi-supervised learning, naïve Bayes, Bayesian networks, decision trees, neural networks, fuzzy logic models, and/or probabilistic classification models.

The trend analysis module 220 may analyze trends that indicate emerging issues with specific user devices, service plans, and/or network infrastructure. A trend may provide statistics on an issue that the subject user device is experiencing. As a result, appropriate warnings and solutions may be disseminated to users and CSR's. For example, the trend analysis module 220 may detect a spike in the number of battery alerts on a particular day from data received from the device information database 110. Subsequently, the trend analysis module 220 may infer that the spike in the number of battery alerts coincides with the release of a new line of user devices. Accordingly, the trend analysis module 220 may indicate on the dashboard of the CSR that the present model of the user device has a high probability of suffering from the same malfunction. The remedy may be a software patch that may be performed via communication between the workflow engine 102 and the device management application of the user device over the network 108.

In some embodiments, the trend analysis module 220 may be used to analyze multiple trends, such as comparing current trends to historical trends. For example, a current trend for a particular issue, such as battery alerts for a particular line of user devices at launch, may be compared to battery alerts for another line of user devices at launch. Such comparisons may provide insight into long term evolution of technology and issues that have surfaced or disappeared as a result of such evolution.

In one embodiment, the workflow engine 102 includes a parser, which is a software component of the workflow engine 102 that accepts input data in the form of text and builds a data structure therefrom to extract the relevant symptoms of the user device from manual entry by the CSR.

Figure 3A:
FIG. 3A illustrates a dashboard that may be displayed during a preliminary stage of the user device diagnostics.
Figure 3B:
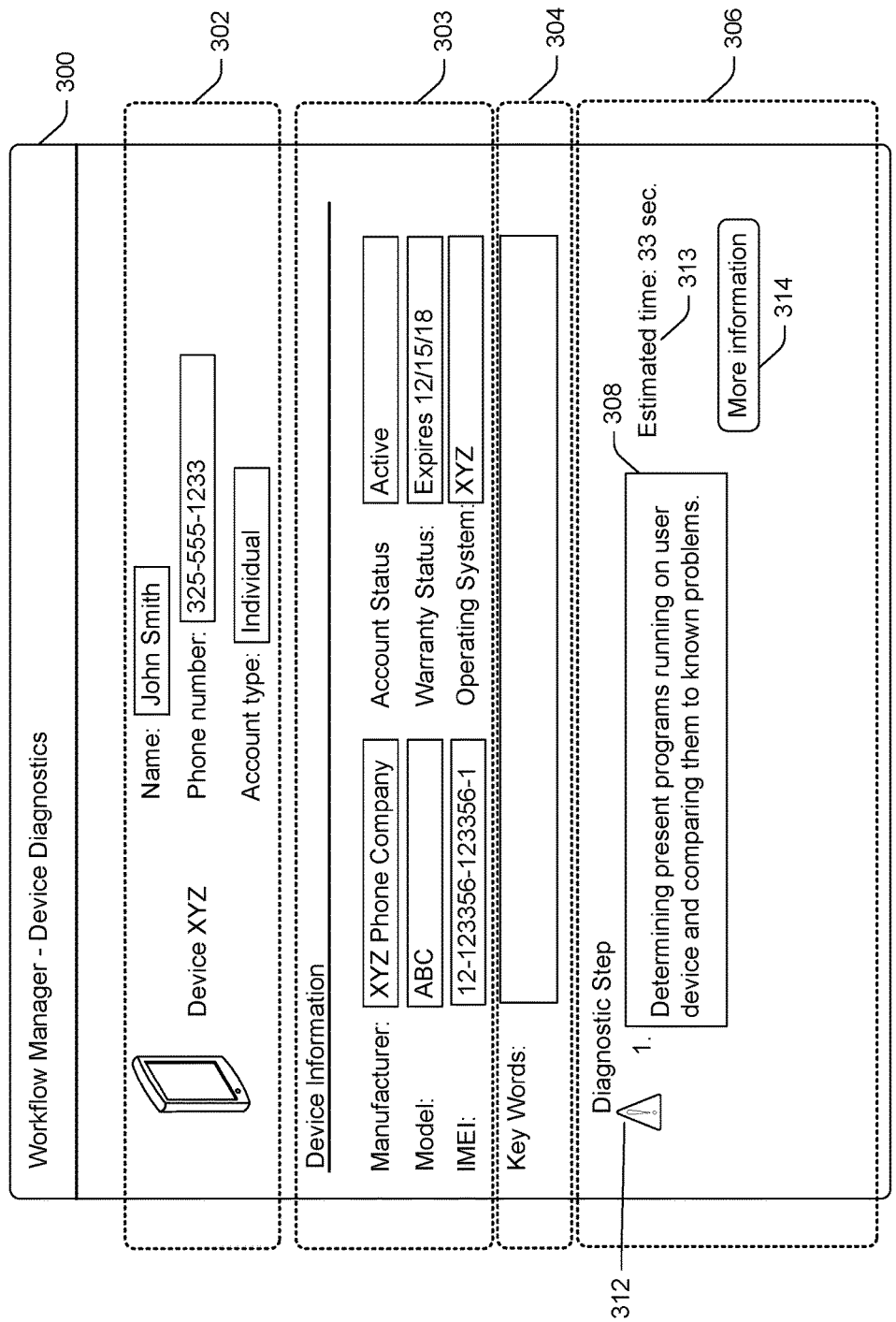
FIG. 3B illustrates a dashboard during a diagnostic step.
Figure 4:
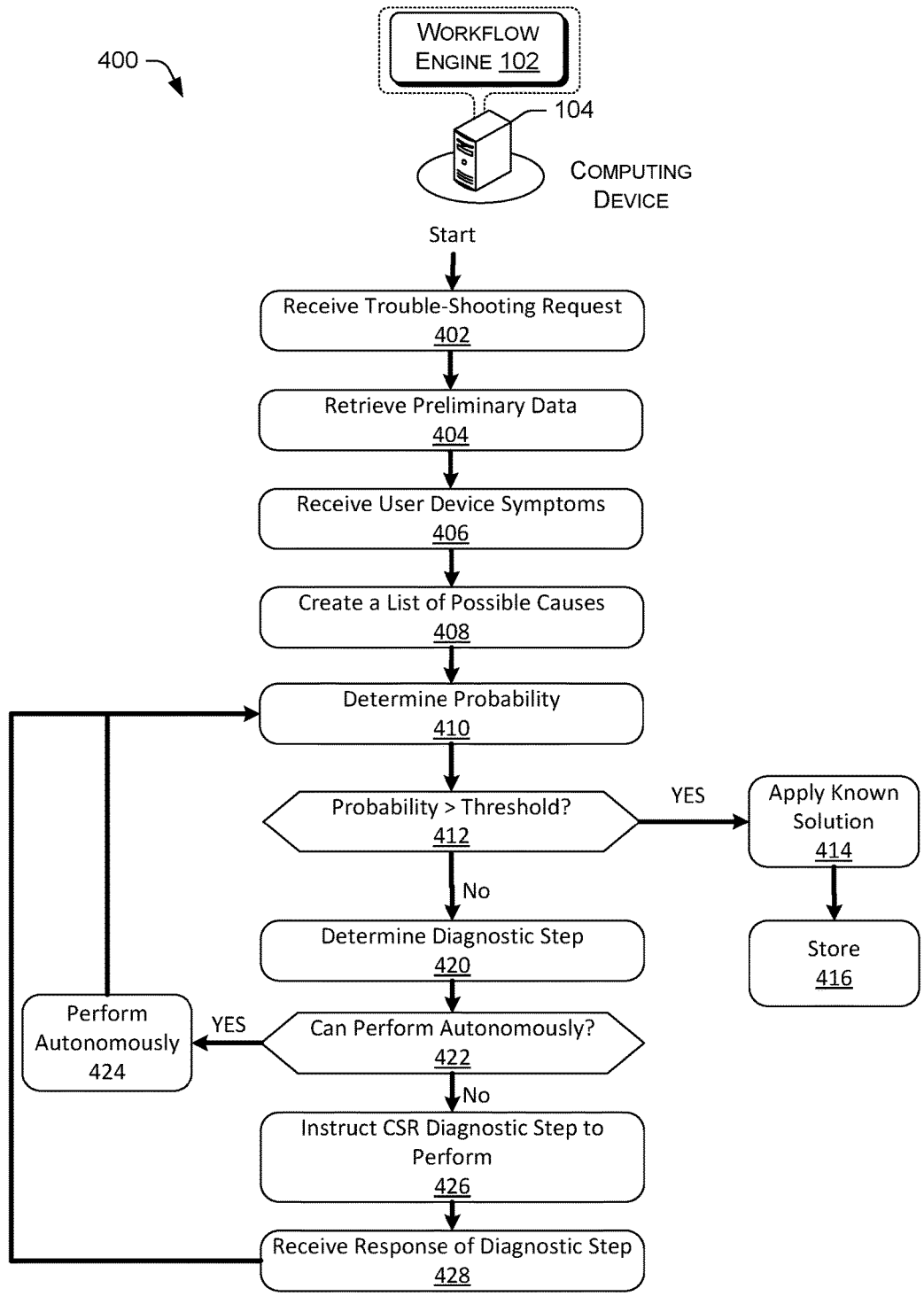
FIG. 4 presents an illustrative process for using a workflow engine to assist a CSR to troubleshoot and resolve issues of a user device.

Additional details regarding the functionalities of the workflow engine 102 are discussed in the context of FIGS. 3-4. Thus, the workflow engine 102 may include other modules that perform the functionalities described in the context of these figures.

Example Dashboard

FIGS. 3A and 3B are illustrate different aspects of a dashboard for device diagnostics provided by the workflow manager on a display of a CSR terminal. FIG. 3A illustrates a dashboard 300 that may be displayed during a preliminary stage of the user device diagnostics. FIG. 3B illustrates a dashboard during a diagnostic step. The diagnostic dashboard 300 may include a subscriber information portion 302, a device information portion 303, a key word portion 304, and a statistical analysis portion 305.

The subscriber information portion 302 may display the identification information of a subscriber. For example, the subscriber information may include the name of the subscriber, account identification of the subscriber, and an account type of the subscriber.

The device information portion 303 may display user device information of the subject user device. The user device information that is displayed may include a manufacturer of the user device, a model name of the user device, a user device identifier of the user device, an account status, a device warranty status, and the operating system, and the like. In one embodiment, the subscriber information portion 302 and the device information portion 303 is automatically populated. To that end, the workflow engine driving the dashboard 300 may retrieve the subscriber information and the device information upon the CSR receiving the troubleshooting request. For example, the workflow engine may communicate with the device management application of the user device and/or other network databases, to populate the corresponding fields in the subscriber information portion 302 and device information portion 303. If a field cannot be retrieved automatically by the workflow engine, the dashboard may display instructions to the CSR as to what information needs to be queried next and how to obtain the information. Upon determining the relevant data, the CSR can populate the field(s) accordingly.

In one embodiment there is a key words portion 304 where the CSR can enter the key words related to the malfunction. For example, the customer may complain that the "phone freezes frequently." In various embodiments, the CSR can enter the key words associated with the malfunction via manual entry (e.g., a keyboard), a binary selection of common symptoms in the form of a checklist (not shown) via a mouse, or via voice recognition through a microphone of the terminal. If the terms are entered via keyboard or microphone, the relevant key terms may then be identified by analyzing the text with a natural language parser for common terms that are associated with the user device.

The dashboard 300 may include a statistical analysis portion 305 that determines the probability of the likely causes of the malfunction based on the preliminary information provided in the device information portion 302, the device information portion 303, and the key words portion 304. In this regard, the cause, the probability, and a potential solution may be displayed on the dashboard to provide the CSR an overview of what the situation may be in connection with the malfunctioning user device. Accordingly, the CSR does not need an advanced knowledge of the networks discussed herein or the functionality of the user device in order to come to an understanding of the status of the user device.

In one embodiment, if the probability of the most likely cause is not above a predetermined threshold (e.g., 95%), the troubleshooting iteratively continues by the workflow engine providing one or more additional diagnostic steps. In one embodiment, if the solution to the likely cause is not provided, then the probability does not exceed the predetermined threshold level. Put differently, the diagnosis continues until the cause is further fine-tuned and a solution is identified.

FIG. 3B illustrates a dashboard during a diagnostic step. In various embodiments, one or more portions of FIG. 3A, such as the subscriber information 302, device information 303, and the key word entry field, may still be displayed on the dashboard 300. The diagnostic portion displays the diagnostic step to be performed and/or being presently performed. For example, the workflow engine may determine that an additional diagnostic step is warranted. First, the workflow engine determines whether the diagnostic step can be performed automatically. If so, the dashboard may display the present diagnostic step being performed in a diagnostic field 308. In one embodiment, the remaining estimated time is displayed in a separate field 313 to provide better guidance to the CSR. Such information may be particularly useful for the CSR to communicate to the customer, such that the customer feels engaged in the actions performed, thereby resulting in a better customer experience. In one embodiment, the diagnostic step 308 and/or the estimated time 313 is also sent by the workflow engine to the device management application of the user device for display on the user interface of the user device. In this way, the customer can follow what actions are being performed in connection with their service call.

In various embodiments, the CSR may be able to control whether the diagnostic step is sent to the user device for display, and the customer may be able to interactively select whether they allow the proposed diagnostic step to be performed.

If the workflow engine determines that the next step may not be able to be performed automatically, the diagnostic portion 306 may display instructions to the CSR as to how to guide the customer to determine the correct information 308 and the estimated time 313 that this diagnostic step is expected to take. The dashboard may include prepopulated selections that the CSR can select in a binary way or manually enter based on the response received from the customer.

It should be noted that, in one embodiment, the dashboard 300 of the workflow engine allows the CSR to enter key words during any time during the call. For example, the customer may remember that a new battery was installed in the past few days. The CSR may enter such information (e.g., "new battery installed") which is parsed and its key terms entered as known data to the workflow engine. In this regard, the workflow engine may recalculate the probability of the likely causes of the malfunction based on all known information (e.g., subscriber information, device information, key words, and results of diagnostic steps).

In one embodiment, the diagnostic step 308 may be displayed with a visual indicator 312 that alerts the CSR to the importance of the diagnostic step 308. In this regard, the CSR may ask the customer not to turn off their user device until the diagnostic step completes. The diagnostic portion of the dashboard 300 may further include an information control 314 that, upon selection, leads to a knowledge base article providing more detail in connection with the present diagnostic step and for resolving a specific issue with the user device.

Example Processes

With the foregoing overview of the architecture 100 and workflow manager device diagnostics dashboard 300, it may be helpful now to consider a high-level discussion of an example process. To that end, FIG. 4 presents an illustrative process 400 for using a workflow engine to assist a CSR to troubleshoot and resolve issues of a user device of a customer that subscribe to the communication services of the network 108 and PDCN 106 of FIG. 1. Process 400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the process 400 is described with reference to the architecture 100 of FIG. 1.

At block 402, the workflow engine 102 stored in the memory of the computing device 104 of the CSR receives a trouble-shooting request from a user device. For example, a customer may call from their user device to report a malfunction of their user device. In one embodiment, the troubleshooting may have already been initiated on the user device via a device management application (i.e., stored in the memory of the user device).

At block 404, preliminary data is retrieved by the workflow engine 102. The preliminary data may include subscriber information, such as name, contact information, account type and user device type. The preliminary data may also include device information, such as the manufacturer, model type, model equipment identifier (IMEI) number, account status, and warranty status. In some embodiments, the operating system, a version of the operating system, and/or a list of active programs that are presently running on the user device are retrieved as well. The retrieval of the preliminary data may be performed automatically (i.e., without direct involvement of the CSR and the customer). In the scenario where the troubleshooting was initiated on the user device (e.g., via the device management application) the steps performed and/or the actions taken are received in the preliminary data. It will be understood that the retrieval of information in connection with the user device is performed with present or prior approval from the customer (e.g., account holder).

The preliminary data may be retrieved based on the phone number used to initiate the trouble-shooting request. In one embodiment, the workflow engine may inquire the customer whether the present trouble-shooting request is related to the user device presently used to initiate the call. For example, the prompt may be an audio or visual prompt on the user device.

In various embodiments, the preliminary data may be retrieved by the workflow engine 102 from various sources, such as the network information database 109, device information database 110, user account database 112, and the user device (i.e., via the device management application stored in the memory of the user device).

At block 406 the workflow engine receives one or more symptoms of the user device. In various embodiments, the CSR can enter key word(s) related to the malfunction, such as "calls are dropped after 5 minutes of conversation." These key words may be provided by the customer during the troubleshooting call. The key words can be entered manually via a keyboard or via voice through a microphone of the CSR terminal. Alternatively or in addition, the symptoms can be received by the workflow engine via a binary selection of common symptoms in the form of a checklist that is displayed on the dashboard of the CSR terminal. The common symptoms may be collected from the device information database 110.

At block 408, the workflow engine 102 creates a list of possible causes of the malfunction based on the presently known data of the user device. For example, the presently known data may initially be based on the received device symptoms and the preliminary data. However, as the diagnosis advances, the knowledge (e.g., data) increases based on diagnostic steps, as is explained in the context of the blocks below.

At block 410, the probability of each possible cause of the malfunction is determined. The probability may be based on known data related to the user device. As more knowledge is obtained via diagnostic steps, the closer to the true cause of the malfunction the workflow engine 102 may lead. In one embodiment, any possible cause that has a probability that is below a predetermined threshold (e.g., 5%) is discarded from the analysis.

At step 412, the workflow engine determines whether the probability of the most likely cause of the malfunction is above a predetermined threshold. In various embodiments, the threshold may vary based on the severity and/or the cost to cure the malfunction. For example, a higher probability threshold may be set for a possible cause that has a solution that is above a predetermined cost level (in time and/or material cost). Put differently, the higher the cost to cure the malfunction, the higher the confidence level required in the diagnosis.

If the probability of the most likely cause of the malfunction is above the predetermined threshold (i.e., "YES" at block 412), then the process continues with block 414, where a known solution is applied. In various embodiments, the remedy may be to change the configuration/setting of the user device, which may be performed by the workflow engine 102 by sending corrective instructions to the user device over the network 108, providing a link to the user device for a software patch, interactive instructions that are displayed on a dashboard of the user device to guide the customer to perform the corrective action, and the like.

At block 416, the audit trail is stored. In various embodiments, the device data, audit trail, and the solution to the malfunction is stored by the workflow engine in a memory of the computing device 104 and/or one of the network databases (e.g., network information database 109, device information database 110, and/or user account database 112). The stored data can later be used by the workflow engine for other trouble tickets.

Returning back to block 412, upon determining that the most likely cause of the malfunction is not above the predetermined threshold (i.e., "NO" at block 412), the process continues with block 420, where the next diagnostic step is determined, based on the known data.

At block 422 the workflow engine determines whether the diagnostic step can be performed automatically. If so (i.e., "YES" at decision block 422), the diagnostic step is performed automatically by the workflow engine 102. For example, the workflow engine 102 may retrieve and analyze information from a network database. Alternatively or in addition, the workflow engine 102 may interact with the device management application of the user device to retrieve the relevant information therefrom.

In one embodiment, if the solution to the likely cause is not provided, then the probability does not exceed the predetermined threshold level. Put differently, the diagnosis continues until the cause is further fine-tuned and a solution to the malfunction is identified.

In various embodiments, the dashboard of the CSR terminal coupled to the computing device 104 and/or the user device, may display the present diagnostic step being performed and the remaining estimated time for its completion. By automatically performing the diagnostic step, the workflow engine gains additional data from the feedback of the diagnostic step. The diagnosis can now continue with more data knowledge.

The process continues with block 408, where a new list of possible causes is generated based on the expanded knowledge base related to the present trouble ticket. The process continues iteratively until the probability of the most likely cause of the malfunction is above a predetermined threshold and a solution is applied.

Returning back to block 422, upon determining that the diagnostic step cannot be performed automatically (i.e., "NO" at decision block 422), the process continues with block 426, where the workflow engine displays the next diagnostic step on the dashboard of the computing device.

The instructions may include how to guide the customer to determine the correct information. The dashboard may include prepopulated selections that the CSR can select in a binary way or manually enter.

At block 428 the workflow engine 102 receives the response of the diagnostic step. The process then continues with block 408, as described above.

Accordingly, the workflow engine 102 uses various automatic sources of data to dynamically streamline diagnostic steps to empower a CSR to resolve issues relating to a user device in a more expedient and effective manner The use of the workflow engine as part of a customer care infrastructure discussed herein reduces the effort on the part of the CSR and the diagnostic tasks requested from the customer, resulting in a more consistent and efficient resolution of the trouble ticket.

CONCLUSION

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

It is understood that the receipt of any data by the workflow engine is performed upon subscriber approval. It is understood that any specific order or hierarchy of steps in the process disclosed in FIG. 4 is illustrations of exemplary approaches. Based upon design preferences, it is understood that the specific order or hierarchy of steps in the processes may be rearranged, expanded, and some steps omitted. Some of the blocks may be performed simultaneously.

Unless otherwise stated, any measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing device operable by a customer service representative (CSR), the computing device comprising:
   a processor;
   a network interface coupled to the processor;
   a storage device for content and programming coupled to the processor;
   a workflow engine application stored in the storage device, wherein execution of the workflow engine application by the processor configures the computing device to dynamically perform acts comprising:
   receiving, from a device management application of a user device, a troubleshooting request for a malfunction of the user device;
   receiving, from the device management application of the user device, key performance indicators and information about a model, a make, or a configuration of the user device;
   determining possible causes of the malfunction;
   based at least in part on the determining possible causes of the malfunction, determining a probability of each possible cause of the malfunction;
   based at least in part on the determining the probability of each possible cause of the malfunction, determining a most likely cause of the malfunction;
   based at least in part on the determining the most likely cause of the malfunction, determining if the probability associated with the most likely cause of the malfunction is above a predetermined threshold;
   upon determining that the probability associated with the most likely cause of the malfunction is above the predetermined threshold, providing a solution to the malfunction; and
   upon determining that the probability associated with the most likely cause of the malfunction is not above the predetermined threshold:
      determining a diagnostic step to perform;
      determining, based at least in part on the model, the make, or the configuration of the user device, if the diagnostic step can be performed automatically;
      upon determining that the diagnostic step can be performed automatically:
         interacting with the device management application of the user device to automatically perform the diagnostic step; and
         repeating the determining of possible causes of the malfunction; and
      upon determining that the diagnostic step cannot be performed automatically:
         causing the diagnostic step to be displayed on a dashboard of the computing device to the CSR;
         receiving a manual entry in response to the diagnostic step; and
         repeating the determining of possible causes of the malfunction.

2. The computing device of claim 1, wherein execution of the workflow engine application by the processor further configures the computing device to perform acts comprising:
   upon receiving the troubleshooting request for the malfunction of the user device:
      retrieving preliminary data related to the user device; and
      receiving one or more symptoms of the malfunction.

3. The computing device of claim 2, wherein the preliminary data comprises at least one of:
   the model of the user device;
   the make of the user device;
   an operating system of the user device;
   an operating system version number of the user device; and
   a list of active programs that are presently running on the user device.

4. The computing device of claim 3, wherein the preliminary data is automatically retrieved by the workflow engine from at least one of:
   a user device; and
   a network database.

5. The computing device of claim 3, wherein the preliminary data is automatically retrieved from a network database, the network database comprising at least one of:
   a network information database;
   a device information database; and
   a user account database.

6. The computing device of claim 2, wherein determining possible causes of the malfunction is based on at least the received one or more symptoms and the preliminary data.

7. The computing device of claim 6, wherein determining possible causes of the malfunction is further based on results of all diagnostic steps.

8. The computing device of claim 1, wherein execution of the workflow engine application by the processor further configures the computing device to perform acts comprising:
   upon the act of determining that the probability of the most likely cause of the malfunction is above a predetermined threshold, storing the determined cause of the malfunction and its solution in a network database.

9. The computing device of claim 1, wherein automatically performing the diagnostic step comprises at least one of:
   electronically communicating with a device management application, stored in a memory of the user device, to accommodate the diagnostic step.

10. The computing device of claim 1, wherein automatically performing the diagnostic step comprises electronically communicating with at least one of the following, to accommodate the diagnostic step:
    a network information database;
    a device information database; and
    a user account database.

11. The computing device of claim 1, wherein receiving one or more symptoms of the malfunction comprises at least one of:
    parsing key terms entered on a dashboard of the computing device; and
    receiving a binary selection of symptoms that are displayed on the dashboard of the computing device.

12. The computing device of claim 1, wherein execution of the workflow engine application by the processor further configures the computing device to perform acts comprising undoing the providing the solution to the malfunction upon determining that the provided solution does not resolve the malfunction.

13. A method of dynamically diagnosing a malfunction of a user device, the method comprising:
    receiving, by a workflow engine application from a device management application of the user device, a troubleshooting request for the malfunction from the user device;
    receiving, by the workflow engine application from the device management application of the user device, key performance indicators and information about a model, a make, or a configuration of the user device;

determining, by the workflow engine application, one or more possible causes of the malfunction;

based at least in part on the determining possible causes of the malfunction, determining, by the workflow engine application, a probability of each possible cause of the malfunction;

based at least in part on the determining the probability of each possible cause of the malfunction, determining, by the workflow engine application, a most likely cause of the malfunction;

based at least in part on the determining the most likely cause of the malfunction, determining, by the workflow engine application, if the probability associated with the most likely cause of the malfunction is above a predetermined threshold;

upon determining that the probability associated with the most likely cause of the malfunction is not above the predetermined threshold:
 determining a diagnostic step to perform;
 determining, by the workflow engine application and based at least in part on the model, the make, or the configuration of the user device, if the diagnostic step can be performed automatically;
 upon determining that the diagnostic step can be performed automatically:
  automatically performing, by the workflow engine application, the diagnostic step; and
  repeating the determining of one or more possible causes of the malfunction; and
 upon determining that the diagnostic step cannot be performed automatically:
  causing, by the workflow engine application, the diagnostic step to be displayed on a dashboard of a computing device to a customer service representative;
  receiving a manual entry in response to the diagnostic step; and
  repeating the determining of one or more possible causes of the malfunction.

14. The method of claim 13, further comprising:
upon receiving the troubleshooting request for the malfunction of the user device:
 retrieving preliminary data related to the user device; and
 receiving one or more symptoms of the malfunction.

15. The method of claim 14, wherein:
retrieving preliminary data comprises automatically retrieving from at least one of:
 a user device; and
 a network database, and
the network database comprises at least one of:
 a network information database;
 a device information database; and
 a user account database.

16. The method of claim 14, wherein determining possible causes of the malfunction is based on at least the received one or more symptoms and the preliminary data.

17. The method of claim 16, wherein determining possible causes of the malfunction is further based on results of all diagnostic steps performed for the user device.

18. The method of claim 13, further comprising upon determining that a probability of a most likely cause of the malfunction is above a predetermined threshold, providing a solution to the malfunction.

19. The method of claim 13, wherein receiving one or more symptoms of the malfunction comprises at least one of:
 parsing key terms entered on a dashboard of the computing device; and
 receiving a binary selection of symptoms that are displayed on the dashboard of the computing device.

20. The method of claim 13, further comprising undoing the providing the solution to the malfunction upon determine that the provided solution does not resolve the malfunction.

* * * * *